Patented Aug. 20, 1940

2,212,104

UNITED STATES PATENT OFFICE 2,212,104

METHOD FOR THE PREPARATION OF $\Delta^4$-PREGNENOL-20-ONE-3 AND INTERMEDIATES OBTAINED THEREIN Erwin Schwenk, Montclair, N. J., Bradley Whitman, New York, N. Y., and Gerhard A. Fleischer, Montclair, N. J., assignors to Schering Corporation, Bloomfield, N. J., a corporation of New Jersey No Drawing. Application May 6, 1937,
Serial No. 141,103

17 Claims. (Cl. 260—397)

The present invention relates to the production of $\Delta^4$-pregnenol (20)-one(3) of the formula $C_{21}H_{32}O_2$ and to intermediate compounds from which this substance can be prepared.

The $\Delta^4$-pregnenol (20)-one(3) has been prepared by Butenandt and Schmidt (Ber. d. d. chem. Ges., vol. 67, page 2092) by starting with pregnandiol obtained from the urine of pregnant women. This method has a number of disadvantages and the yields are comparatively low.

We have found that it is possible to prepare this compound by starting with pregnenol (3)-one-(20) of the formula $C_{21}H_{32}O_2$, which can easily be obtained in large amounts by oxidation of cholesterol, according to the copending application of Erwin Schwenk and Bradley Whitman, Serial No. 129,222, filed March 5, 1937, or by a series of reactions starting from stigmasterol obtained from soy beans. We have found also that pregnenol (3)-one-(20) in the form of the 3-substituted compound, the substituent being a group which on hydrolysis is replaced by a hydroxy group, such as the 3-acetate, can be reduced under proper conditions to convert the keto group into a secondary alcohol group without hydrogenating the double bond, as by means of hydrogen and a catalyst consisting of nickel or a nickel-containing alloy, to give, for example, the monoacetate of the pregnendiol 3,20. This compound can be again acylated, using, for example, acetic anhydride or benzoylchloride. In this way, diesters of the pregnendiol (3,20) are obtained, which contain either identical acid residues or two different residues. We have further found that it is possible to saponify partially these diesters of pregnendiol, whereby only the acyl group in the 3-position is split off. In this way, the isomeric monoesters of pregnendiol (3,20) of the formula $C_{21}H_{34}O_2$ are obtained, in which the acid group is in the 20-position. The new monoesters are now preferably treated to effect the addition of removable groups, as by halogenation, for the protection of the double bond, and are then oxidized with chromic acid, whereby compounds are obtained in which in the first ring a keto group in the 3-position is adjacent to a double bond from C atom 4 to C atom 5. These new monoesters may again be saponified, whereupon the $\Delta^4$-pregnenone(3)-ol(20) is obtained.

Example 1

10 gm. of pregnenolone acetate (3) of the formula $C_{23}H_{34}O_3$ are dissolved in 200 cc of alcohol, 5 gm. of Raney catalyst are added, and then the mixture shaken in a hydrogen atmosphere until one mol of hydrogen is taken up. After filtration from the catalyst, the liquor or solution is treated with water, and the resulting precipitate dried without further purification. The dry substance is dissolved in 100 cc of pyridine and 15 cc of benzoyl chloride added. This mixture is allowed to stand over night and is then worked up by admixing ether, washing the ether solution with dilute acid and with water and drying the ether solution. After evaporation, the residue is recrystallized from acetone, whereby 10 gm. of the hitherto unknown $\Delta^4$-acetoxy(3)-benzoxy(20)-pregnene are obtained which melts at 190° C. In the mother liquor, an isomeric compound is also present which originates by the addition of hydrogen to the keto group in C-20.

5 gm. of the mixed ester are dissolved in 900 cc of methyl alcohol, 1 mol of KOH is added, and the mixture shaken for 20 hours. The alkaline reaction mixture is neutralized by adding slightly more than the necessary amount of acetic acid, and the solution steamed down until crystallization occurs. The pregnenol (3)benzoxy(20) is obtained in crystals, showing a melting point of 182°. 4 gm. of this compound are dissolved in 100 cc of acetic acid, 1.1 mol of bromine is added, and then 5 atoms of oxygen in the form of chromic acid dissolved in acetic acid are dropped in slowly. The temperature is kept between 15 and 20 degrees, and the solution is held at this temperature for about 15 hours after the addition of the chromic acid is completed. 20 gm. of zinc dust are now added in small portions under vigorous stirring, the reaction mixture is warmed up for 15 minutes to 80° C., filtered from the zinc dust, and then precipitated with water. The precipitate is taken up in ether, washed with soda solution and water, and finally dried. After evaporation a residue is obtained which may be recrystallized from acetone, and then is obtained in beautiful crystals, melting at 178° C. 3 gm. of this latter compound are dissolved in 150 cc of methyl alcohol, to which 2% of KOH have been added. By boiling for 2 hours the benzoyl group is split off, and after cooling and adding water, the $\Delta^4$-pregnenol(20)-one(3) is obtained. Its melting point is 160°.

Example 2

If instead of benzoyl chloride in the second step of the above procedure, acetic anhydride is used, the diacetate of pregnendiol (3,20) is obtained. This substance can again be partially saponified, whereby the pregnenol (3)-acetoxy(20) is obtained.

This substance can be oxidized with chromic acid after protection of the double bond in any known manner, and the Δ⁴-acetoxy(20)-pregnenone(3) M. P. 138–140 so obtained is saponified by boiling with alcohol and KOH. A compound identical with the substance in the first example is obtained. Yields are, however, about 10% lower than in the first example.

The pregnenolene and its derivatives have male hormone characteristics and are therefore useful in hormone therapy.

While in the above examples the reduction is effected with the aid of hydrogen in the presence of a nickel-containing catalyst, it will be understood that other, relatively mild, reduction conditions may be employed which will cause reduction of the keto group without any considerable hydrogenation of the nucleus of the compound treated. More active catalysts, like platinum, may, however, be employed if the absorption of hydrogen is limited to one mol. Also, any ester of pregnenolone may be employed, organic or inorganic, and also the ethers; in fact, as already indicated, the substituting group may be any that on hydrolysis is replaced by the hydroxy group.

We claim:

1. The method for the preparation of Δ⁴-pregnenol(20)-one(3) of the formula $C_{21}H_{32}O_2$, which comprises reducing a pregnenol(3)-one(20) compound having a substituting group in the 3-position which on hydrolysis is replaced by a hydroxy group, to the corresponding pregnendiol compound, converting the 20-hydroxy group into a non-oxidizable group which on hydrolysis is replaced by the hydroxy group, partially saponifying the di-substituted pregnendiol to replace the substituent in the 3-position with a hydroxy group, oxidizing the compound so obtained to convert the 3-hydroxy group into a keto group, and saponifying the oxidation product to replace the 20-substituent with a hydroxy group.

2. The method according to claim 1, wherein the hydroxyl group in the 3-position of the starting material is substituted by an acid radical.

3. The method according to claim 1, wherein the hydroxyl group in the 3-position of the starting material is replaced by an acetoxy group.

4. The method according to claim 1, wherein the reduced starting material is reacted with an acylating agent to replace the 20-hydroxyl with an acid group.

5. The method according to claim 1, wherein the reduced starting material is reacted with benzoyl chloride.

6. The method according to claim 1, wherein the starting material is pregnenolone acetate (3) and after reduction is reacted with benzoyl chloride.

7. The method according to claim 1 wherein prior to the oxidation the 3-OH-20-substituted pregnendiol is reacted with a substance capable of temporarily saturating the double bond, and wherein the oxidized compound is treated with an agent capable of removing such substance and restoring the double bond.

8. The method according to claim 1 wherein prior to the oxidation the 3-OH-20-substituted pregnendiol is reacted with halogen to saturate the double bond, and wherein the oxidized compound is treated with an agent capable of removing the halogen to restore the double bond.

9. The method according to claim 11 wherein prior to the oxidation the 3-OH-20-substituted pregnendiol is reacted with a substance capable of temporarily saturating the double bond, and wherein the oxidized compound is treated with an agent capable of removing such substance and restoring the double bond.

10. The method according to claim 1, wherein the double bond is protected, prior to the oxidation, by the addition of bromine, said process including the step of treating the oxidation product with zinc dust to remove the bromine atoms.

11. In a process for the production of Δ⁴-pregnenol(20)-one compounds, the steps which comprise reducing a pregnenol(3)-one(20) compound substituted in the 3-position by a radical which on hydrolysis is replaced by a hydroxy group, to form the corresponding pregnendiol compound, replacing the 20-hydroxyl with a group which on hydrolysis can be re-converted to the hydroxy group, partially saponifying the product to replace the substituent in the 3-position with a hydroxy group, and oxidizing such hydroxy group to a keto group.

12. The method according to claim 11, wherein the reduced starting material is reacted with an acylating agent to introduce an acid group into the 20-position.

13. The method according to claim 11, wherein the reduced starting material is reacted with a substance capable of replacing the 20-hydroxyl with an organic ester group.

14. Δ⁴-benzoxy(20)-pregnenone(3).

15. In a process for the production of pregnenol(20)-one(3) compounds, the step which comprises reacting a pregnendiol(3,20) compound in which the 20-hydroxyl is replaced by a non-oxidizable substituent, with an agent capable of oxidizing the 3-hydroxyl to a keto group.

16. In a process for the production of pregnenol(20)-one(3) compounds, the step which comprises reacting a 20-ester of pregnendiol (3,20) with an agent capable of oxidizing the 3-hydroxyl to a keto group.

17. The Δ⁴-acetoxy-(3)-benzoxy-(20)-pregnene.

ERWIN SCHWENK.
BRADLEY WHITMAN.
GERHARD A. FLEISCHER.